(12) United States Patent
Namgoong

(10) Patent No.: US 8,023,699 B2
(45) Date of Patent: Sep. 20, 2011

(54) IRIS RECOGNITION SYSTEM, A METHOD THEREOF, AND AN ENCRYPTION SYSTEM USING THE SAME

(75) Inventor: Jong Namgoong, Seoul (KR)

(73) Assignee: Jiris Co., Ltd., Seoul (KR)

( * ) Notice: Subject to any disclaimer, the term of this patent is extended or adjusted under 35 U.S.C. 154(b) by 1042 days.

(21) Appl. No.: 11/684,150

(22) Filed: Mar. 9, 2007

(65) Prior Publication Data

US 2008/0219515 A1 Sep. 11, 2008

(51) Int. Cl.
*G06K 9/00* (2006.01)
(52) U.S. Cl. ........................... 382/115; 382/117
(58) Field of Classification Search .................. 382/115, 382/117
See application file for complete search history.

(56) References Cited

U.S. PATENT DOCUMENTS

| | | | |
|---|---|---|---|
| 6,714,665 B1 * | 3/2004 | Hanna et al. | 382/117 |
| 6,895,103 B2 * | 5/2005 | Chen et al. | 382/117 |
| 7,155,035 B2 * | 12/2006 | Kondo et al. | 382/117 |
| 2005/0207614 A1 * | 9/2005 | Schonberg et al. | 382/100 |
| 2006/0008124 A1 * | 1/2006 | Ewe et al. | 382/117 |
| 2006/0098867 A1 * | 5/2006 | Gallagher | 382/167 |
| 2006/0147094 A1 * | 7/2006 | Yoo | 382/117 |
| 2006/0222212 A1 * | 10/2006 | Du et al. | 382/115 |
| 2006/0291702 A1 * | 12/2006 | Miessbacher | 382/117 |
| 2007/0025598 A1 * | 2/2007 | Kobayashi et al. | 382/117 |

* cited by examiner

*Primary Examiner* — Tom Lu
(74) *Attorney, Agent, or Firm* — The Nath Law Group; Jerald L. Meyer; Stanley N. Protigal

(57) ABSTRACT

The present invention generally relates to an iris recognition system, a method thereof, and more specifically, to an iris recognition system comprising the image selector scanning each iris image in pixel unit by using a mask defined into a second area which is in square shape and a first area configured as the peripheral girth of the second area, calculating the number of pixels C1 that luminance values of pixels located in the first area are smaller than a first threshold value and the number of pixels C2 that luminance values of pixels located in the second area are bigger than a second threshold value, and selecting an image of which the calculated pixel C2 values are minimum.

13 Claims, 13 Drawing Sheets

IRIS RECOGNITION SYSTEM, A METHOD THEREOF, AND AN ENCRYPTION SYSTEM USING THE SAME

BACKGROUND

1. Technical Field

The present invention generally relates to an iris recognition system, a method thereof, and an encryption system, and more specifically, to an iris recognition system, a method thereof, and an encryption system having an image extractor for extracting a good image by using a mask from a plurality of images taken by a camera.

2. Background

Personal encryption or personal identification number which is widely used as a traditional method for identifying a person cannot satisfy requirements for stable and exact personal identification in an information society that gradually becomes more developed and ultramodern owing to plagiarism and a risk of loss, and also it can cause a lot of side effects in the entire society due to dysfunction. Particularly, the rapid development of the Internet environment and a sudden increase of E-commerce can predict that there would be tremendous physical and mental losses of persons and groups by only using past traditional personal authentication methods.

As an alternative for complementing demerits of the traditional personal identification methods, biometrics is spotlighted as the most stable and exact personal identification method. Biometrics is a method for identifying a person based on physical (biological) characteristics and behavioral characteristics of each person, and in this case, fingerprints, face, iris, and the lines of the palm may be included in the physical characteristics while signature and voices are classified as the behavioral characteristics. Such personal identification and security based on the personal characteristics cannot be delivered by theft or leakage with no risks of alterations or loss, thus it is possible to perfectly construct an audit function, for instance, a person who makes an infringement can be tracked down.

Especially, among various biometric methods, it is known that the iris of the eye is the most superior part to identify a person in terms of uniqueness, invariability, and stability. Moreover, since an incorrect recognition rate of the iris is very low, the iris is tending to be applied to certain fields that require high-level security.

The iris is fully formed before a baby becomes 3 years old after being born, and if is known that the iris is not changed through life unless special external wounds are inflicted. Also, iris patterns are more various than fingerprints and up to now, it is known as the most perfect personal identification method. Since image acquisition is available in noncontact way, user convenience is also very good, thus it is predicted that market potential would be very high.

Generally, in a method for recognizing a particular person by using the iris, fast detection for the pupil and the iris is essential for real-time iris recognition from an image signal produced by taking a picture of the eye part of a human being. An iris recognition system has a configuration like shown in FIG. 1. The iris recognition system comprises an image input device (10) for inputting a user's iris image, an iris image processor (100) for processing the inputted iris image, an iris image register (200) for registering iris images according to each user, and an iris DB (500) for storing the iris images, then comprises an iris pattern verifier (300) for deciding whether output of the iris image processor (100) and the iris stored in the iris DB (500) are consistent together when authentication is performed. Dotted line arrows of FIG. 1 show a flow that the iris is registered in the iris DB, and solid line arrows display a procedure of taking a picture of an iris of an authenticator and comparing the taken iris with the iris stored in the iris DB to authenticate the compared irises.

A first step of iris recognition is to select a good image among a plurality of images inputted from an image input device. The images inputted from the image input device are different in qualities according to brightness of lighting or spatial environment for image acquisition and a degree of a user's motion. Most of the current iris recognition system has improved a lot in quality deterioration caused by spatial environment, thanks to the development of image input device technology and the development of lighting technology. However, deterioration of image quality resulting from inexperience of the user should be handled by being examined in an inputting step.

If the user who is unfamiliar with iris recognition uses the image input device, it is not easy for the user to adjust a focal distance. As a result, an automatic focus input image device is mostly used for iris recognition, but this device takes the focus only. So, in order to obtain an image having a certain degree of contrast an image of more than a certain quality should be obtained by using a certain degree of a contrast value as a threshold value.

The prior method for obtaining a good image from a plurality of images taken by the image input device is to examine noise (motion blurring) caused by motion and resolution of iris images. The resolution examination is conducted by calculating contrast and a degree of change of light and shade for a certain range of regions around the edge of the pupil, while the method for examining the noise caused by the user's motion is to examine whether motion blurring occurs. The motion blurring indicates a phenomenon that a moving past remains in a taken image when a moving object is taken through an image input device whose shutter speed is low. Examination on the motion blurring was conducted by normalizing an image for a certain area of a horizontal edge part of the common pupil. The image which passes through the resolution examination and the noise examination provides a high image quality for iris recognition, and this procedure was an essential one for increasing a recognition rate.

However, the prior method for obtaining the good image among the plurality of the images taken from the image input device has different threshold values according to colors of the pupils and each human race. Accordingly, it can be hardly applied to nations where various ethnic groups are mixed together. Also, since the features of the irises between Westerners and the Oriental people are different when threshold values are used in the resolution examination, it has a problem that the same threshold values cannot be applied.

SUMMARY

It is therefore an object of the present invention to provide an iris recognition system, a method thereof, and an encryption system using the same having a good image extractor for discriminating a good image by applying a mask to plural images taken by an image input device.

Moreover, it is another object of the present invention to provide an iris recognition system, a method thereof, and an encryption system for reducing iris recognition time as being more reliable, by using iris features extracted from iris information positioned in a particular radius based on the center of the pupil to make fast feature extraction possible as considering patterns of the inside of iris wrinkles.

To accomplish the above object, an iris recognition system, comprising: an image selector for selecting an image in the best state from a plurality of iris images inputted from an image input device; an internal edge extractor for extracting an internal edge of the selected iris image; an external edge extractor for extracting an external edge of the selected iris image; an iris area normalizer for normalizing an iris area; a security level applier for securing the iris which increases according to age; a rotated image processor for taking charge of processing for an inclined iris image; a feature value extractor for extracting a feature value from the iris image; and a consistency decider for comparing the extracted feature value with a stored iris code to decide whether the compared feature value and iris code are consistent; and wherein with regards to each of inputted iris images, the image selector scans each iris image in pixel unit by using a mask defined into a second area which is in square shape and a first area configured as the peripheral girth of the second area, calculates the number of pixels C1 that luminance values of pixels located in the first area are smaller than a first threshold value and the number of pixels C2 that luminance values of pixels located in the second area are bigger than a second threshold value, and selects an image of which the calculated pixel C2 values are minimum.

DETAILED DESCRIPTION

The present invention will now be described more fully hereinafter with reference to the accompanying drawings, in which preferred embodiments of the invention are shown.

First, physiological features of the iris will be described in brief. The iris is a part which shows a color, and contains a lot of features even to detailed parts when being expanded, thereby obtaining a lot of information. The iris is a thin circular plate of 4~5 mm in width, 0.3~0.4 mm in thickness, and 10~12 mm in diameter, and has intrinsic colors by race and person. And, Koreans have various colors in their eyes from dark brown to light brown.

The pupil is located on the center of the iris, and a part where the pupil and the iris are adjoined is called an internal edge while a part where the iris and the sclera are adjoined is called an external edge.

Figure 1:
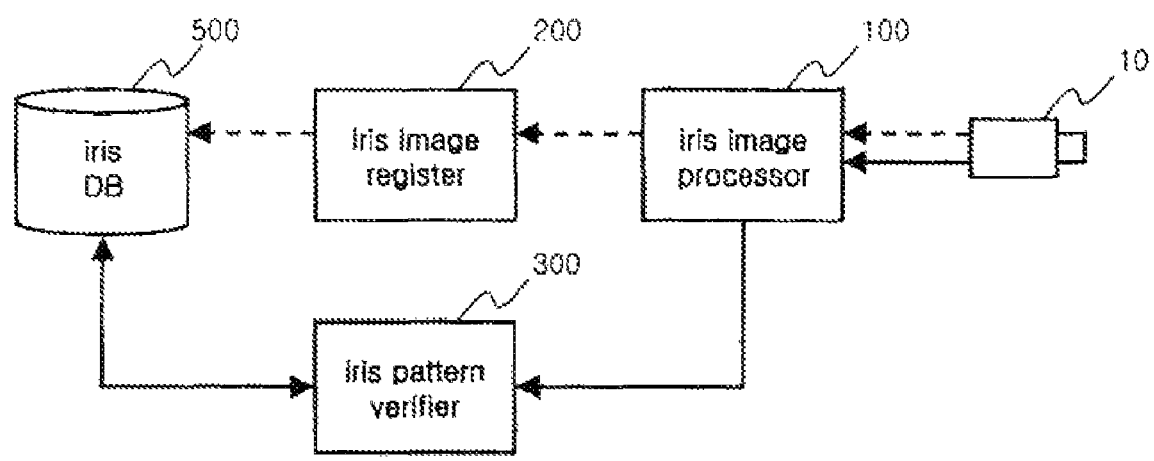
FIG. 1 is a format diagram of an iris system.
Figure 2:
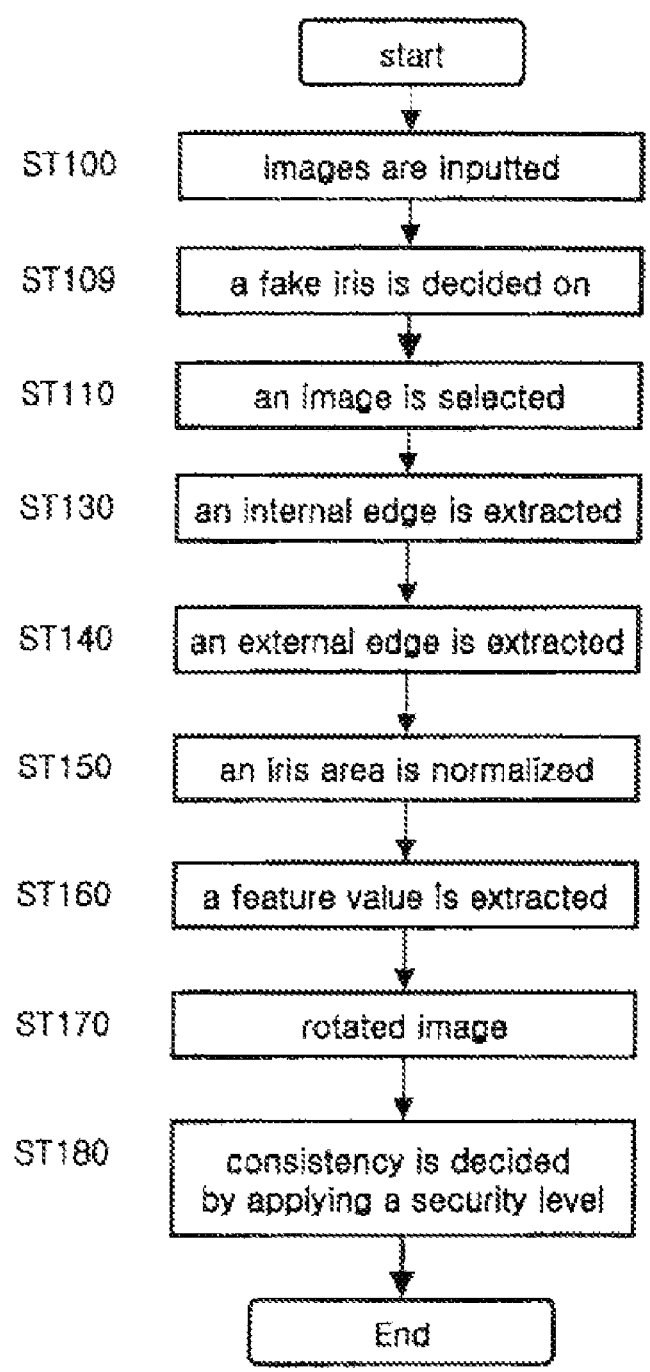
FIG. 2 is a flow chart for processing images inputted from an image input device of an iris image processor in accordance with the present invention.

FIG. 2 illustrates a flow chart for processing images inputted from an image input device of an iris image processor in accordance with the present invention. When the images taken by the image input device are inputted in plural (ST100), it is decided whether a fake image exists in the inputted images (ST109). In case of normal iris images, one of the iris images is selected (ST110). An internal edge side where the pupil and the iris are adjoined and an external edge where the iris and the sclera are adjoined are extracted by using the selected image (ST130, ST140). Next, an iris area is smoothed and normalized, then an iris feature value is extracted (ST150, ST160). Rotated codes for each iris image for a predetermined unit of angular measure inclined at pre-determined angle are calculated and stored in an iris DB, so as to discriminate an iris inputted at various angles in a short time by using the extracted iris feature value (ST170). It is decided whether an iris code stored in the iris DB is consistent with the iris feature value, as applying a security level in consideration of the fact that the iris gradually increases according to age (ST180).

Figure 3:
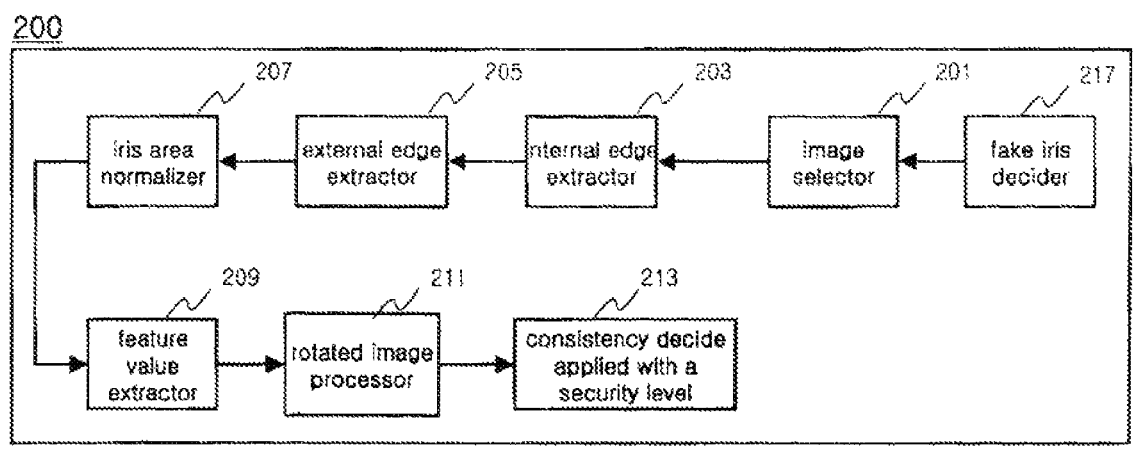
FIG. 3 is a format diagram of an iris image processor for processing images inputted from an image input device in accordance with the present invention.

FIG. 3 is a format diagram of an iris image processor for processing images inputted from an image input device in accordance with the present invention. A fake iris decider (217) decides whether the images inputted from the image input device are fake irises. An image selector (201) selects the best image from the plurality of the images. An internal edge extractor (203) selects an internal edge side where the pupil and the iris are adjoined. An external edge extractor (205) extracts an external edge where the iris and the sclera are adjoined. An iris area normalizer (207) smooths and normalizes an iris area. A feature value extractor (209) extracts an iris feature value from normalized data. A rotated image processor (211) calculates codes for each inclined iris image, and stores the calculated codes in order to conduct fast decision about the iris images which are rotatively inputted. A consistency decider (213) compares the extracted feature value with feature values of each rotated image of the iris stored in the iris DB, and decides whether the extracted feature value is consistent with the feature values of each rotated image. It is needless to say that each configuration unit of FIG. 3 can be processed as a computer readable storage medium, a software module or hardware module. That is, each configuration unit described below may be realized as one or many software modules or as hardware taking charge of each function, then it is also possible for each configuration unit to be in a type that software and hardware are mixed.

1. Image Selection

Illumination having a bright part is located in the pupil by the plurality of the images inputted from the image input device. The images of such an illumination part show a rapid change of gray level compared to the pupil. The present invention is characterized to select a good image by using the rapid change of the gray level.

Figure 4:
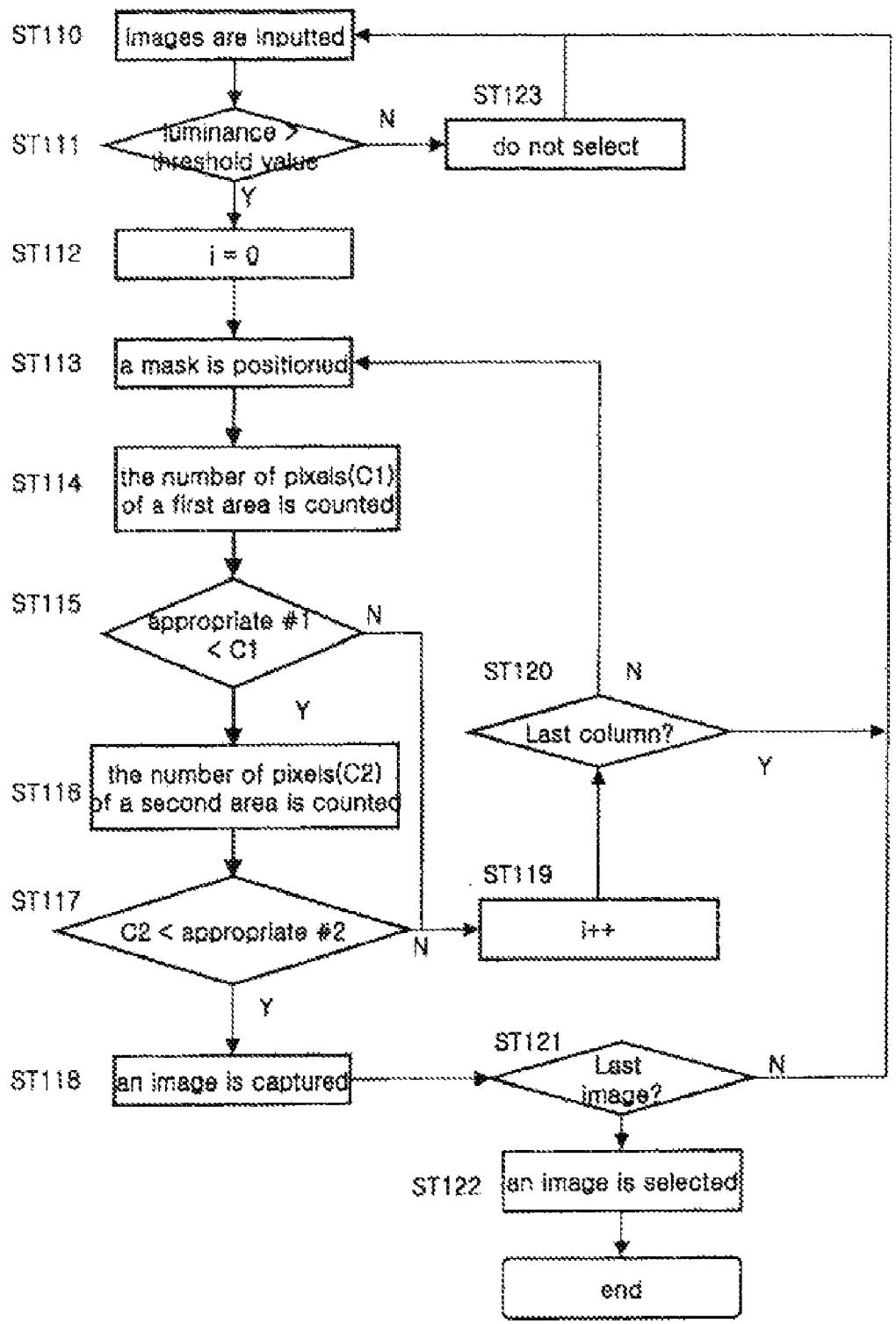
FIG. 4 is a flow chart for selecting a good image in accordance with the present invention.

FIG. 4 illustrates a flow chart for selecting a good image in accordance with the present invention. Supposing that one pixel is displayed in 8 bits and images inputted from an image input device are of 320*240 pixel size in width and length, the present invention will be described as follows.

When the images are inputted from the image input device, it is checked whether pixels whose luminance is less than a first threshold value exist in entire pixels (ST111). The step 'ST111' is a step for selecting an image having a high probability of clear pupil being included. It is checked whether the pupil taken for the image of the image input device has less than the first threshold value. For example, it is possible to suppose that the first threshold value is "20". In case one pixel consists of 8 bits, as a corresponding pixel value gets near to "0", it gets near to a black color, and if the corresponding pixel value gets near to "255", it gets near to a white color. Therefore, the pupil is included in the inputted image, and if the image is in good state, the pupil part has a low luminance value, thereby deciding whether pixels having values less than the first threshold value exist in the pixels. If there are no pixels having the corresponding pixel values less than the first threshold value, it means that the image is not clear, so the corresponding image is not selected, and a next image is processed (ST123).

Then, a variable 'i' is initialized (ST112), and a mask is positioned in a pixel to be checked (ST103). In this case, given that the pupil has a high probability of being approximately located in the middle part of the overall image, a mask work is conducted in the vicinity of the center of the image. For instance, if width and length of pixel size are 320*240, scanning is carried out for an area between a 100th pixel and a 220th pixel from the left in width approximately and an area between a 50th pixel and a 190th pixel from the top in length.

Figure 5:
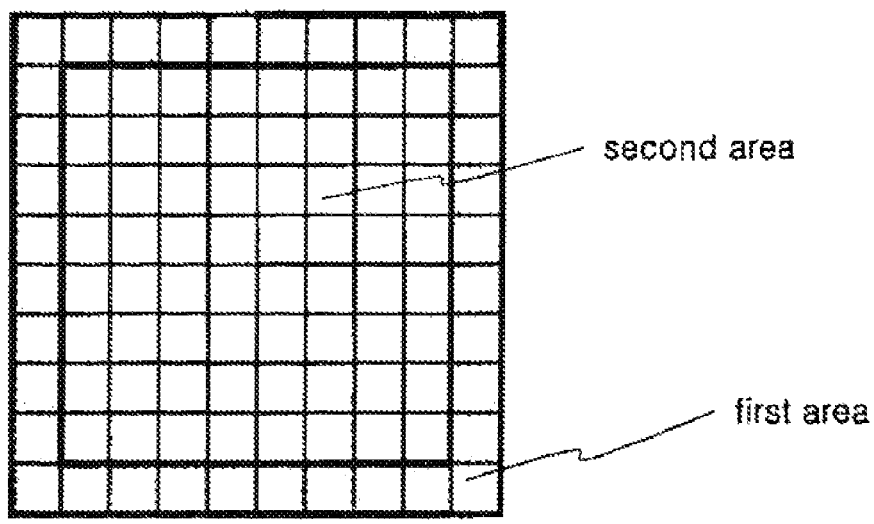
FIG. 5 is one exemplary diagram of a mask to be used in the present invention.

FIG. 5 illustrates one example of a mask to be used in the present invention. The mask is divided into a second area formed in square shape on an inner side of a thick line and a first area that constitutes an external rim area formed in oblique square type positioned between an inner thick line and an outer thick line. The first area is used for scanning a pupil area, while the second area is used for scanning a region where illumination formed inside the pupil is to be located. The shown mask illustrates that the size of width and length is in 10*10 pixels.

The number of pixels that luminance values of pixels included in the first area is smaller than a second threshold value is counted (ST114). Like mentioned above, the first area is a part estimated as a region where the pupil is positioned. So, the second threshold value is defined as a value having dark luminance, for instance, defined as "30", and among the pixels corresponding to the first area, the number of pixels whose pixel values are less than "30" is counted and stored in a variable C1.

It is decided whether the number of the pixels C1 having small luminance than the second threshold value is bigger than an appropriate number #1 among the pixel values belonging to the first area (ST115). When the number of the pixels C1 is the same as the number of the pixels which constitutes the first area, it is the most desirable case, but in consideration of image errors, it is desirable that a range of the predetermined number of the pixels C1 would be larger than at least 75% (defined as "appropriate number #1") of the number of the pixels that constitutes the first area. And, it is an optimum case that the range is the same as "the number of the pixels that constitutes the first area". If the mask of FIG. 4 is applied, the predetermined number of the pixels C1 is bigger than 21 (appropriate number #1) and less than 28.

Next, the number of pixels that luminance values of pixels included in the second area has bigger values than a third threshold value is counted (ST116). As stated above, the second area is a part estimated as a region where illumination within the pupil is positioned. Accordingly, the third threshold value is defined as a value having bright luminance, for instance, defined as "200", and the number of pixels that pixel values exceed "200" among pixels corresponding to the second area is counted and stored in a variable C2.

It is decided whether the number of pixels C2 less than the third threshold value has smaller values than an appropriate number #2 among the pixel values belonging to the second area (ST117). The appropriate number #2 is defined as being 80% of the number of the pixels that constitutes the second area. If such a condition is satisfied, it means that the illumination part inside the pupil has sufficient luminance in the corresponding image and motion burring does not occur in the image, thus a pixel C2 value of the corresponding image is stored and the corresponding image is captured (ST118).

It is decided whether a final image is shown (ST121). In case of the final image, an image having the smallest pixel C2 value is selected as an optimum image (ST122), and the process is terminated. At this moment, a central point of the second area of the selected image is set to an illumination point. If the image is not the final image, a step of processing a next image is progressed. The image having the smallest pixel C2 value means that the smallest illumination size formed in the pupil is maintained in the image, and it is because the user can see with an image where the most exact focus is formed.

If a condition of the pixel C2 value is not satisfied in the step 'ST117', it is decided that an area included in the mask is not the center of the pupil, and an initialization variable is increased by 1 (ST119), then it is decided whether all areas of the corresponding image are scanned (ST120). On this occasion, if the scanning process is finished up to a final scanning area of the corresponding image, a next image inputted from the image input device is processed. The scanning process of the image is progressed in regular sequence that scanning is progressed as preferentially increasing 1 pixel by 1 pixel in width direction, and that a line direction is scanned again after 1 pixel is located in lower direction in length direction when scanning for one line is completed.

The threshold values 1, 2, and 3 and the appropriate numbers #1 and #2 are defined as random natural numbers, and are obtainable by defining numbers which are induced from experiential values appropriate for the used image input device through experimental methods.

Figure 6:
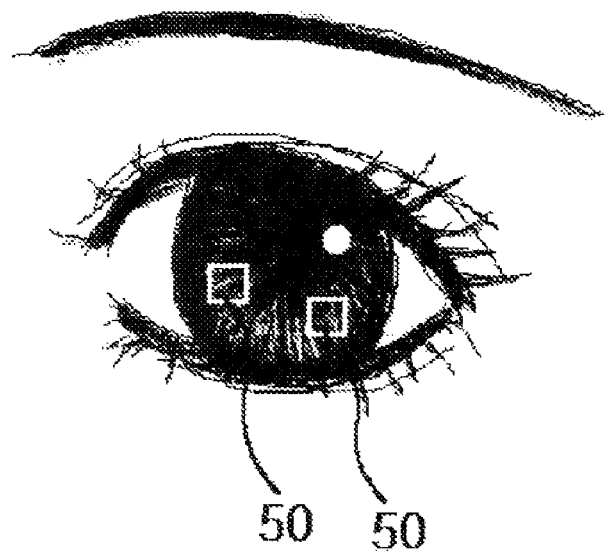
FIG. 6 is an embodiment diagram illustrating a process of scanning an iris image inputted from a stereoscopic image photographing device.

FIG. 6 is an embodiment diagram illustrating a process of scanning an iris image inputted from a stereoscopic image photographing device. Like shown in FIG. 6, a central part of the image is scanned as moving in pixel unit by using masks (50) to perceive an illumination reference point complying with a desired condition.

2. Internal Edge Extraction of the Iris

There are existing methods relating to pupil edge detection, such as a circular edge detector, detection technique using Hough transform, detection using a Canny edge detector, and detection using histogram.

Generally speaking, since the pupil has clear brightness features and forms a circular shape, the circular detection technique is used a lot as a pupil edge detection technique. The circular edge detection technique is a method for finding a spot having a maximum change rate of the circumference by using various centers and radiuses. However, since a circular detector considers the pupil as a circle, it cannot accurately find out geometrical changes of the pupil caused by contraction and relaxation of iris muscles. Thus, photographing should be conducted under regular illumination all the time, and high-priced equipment is required. Furthermore, a lot of calculations should be done as changing radiuses and centers in order to find out a maximum value, resulting in an increase of memory cost and calculation cost.

The Hough transform technique which is one of methods for detecting patterns by using edge components of the pupil has been introduced to detect complex patterns from binary images.

The Hough transform technique is performed by determining parameter values that determine features of particular patterns, so components of patterns which are spatially scattered are converted into features that occupy narrow spaces of certain areas in parameter spaces of the patterns through Hough transform. Therefore, the Hough transform technique can more easily solve a problem by settling the problem which is hard to be solved in image spaces by converting the image spaces into parameter spaces. However, though the Hough transform technique can bring gains in terms of memory cost or calculation cost compared to the circular detection technique, it does not solve an error caused when a geometrical-shaped pupil is detected instead of a circular-shaped one.

A Canny filter is a kind of an edge detection filter, and comprises a process of detecting edges by using a Sobel operator after smoothing an image with a Gaussian filter. This method has several problems that a binarization process is complicated and it is not easy to detect edges if eyebrow or iris patterns are strong.

A histogram analysis method is to extract the pupil by binarizing an image after searching a value corresponding to a pupil part from a histogram of the inputted image, featuring in simple realization and rapidity. Even though this method using the histogram has merits of low calculation cost and simple realization, it is not easy to find a maximum point and a minimum point and moreover, an access to decide a pupil area by using illumination can lead a lot of errors. Besides, if the user who wears glasses or image acquisition equipment is different, the histogram sensitively changes.

Figure 7:
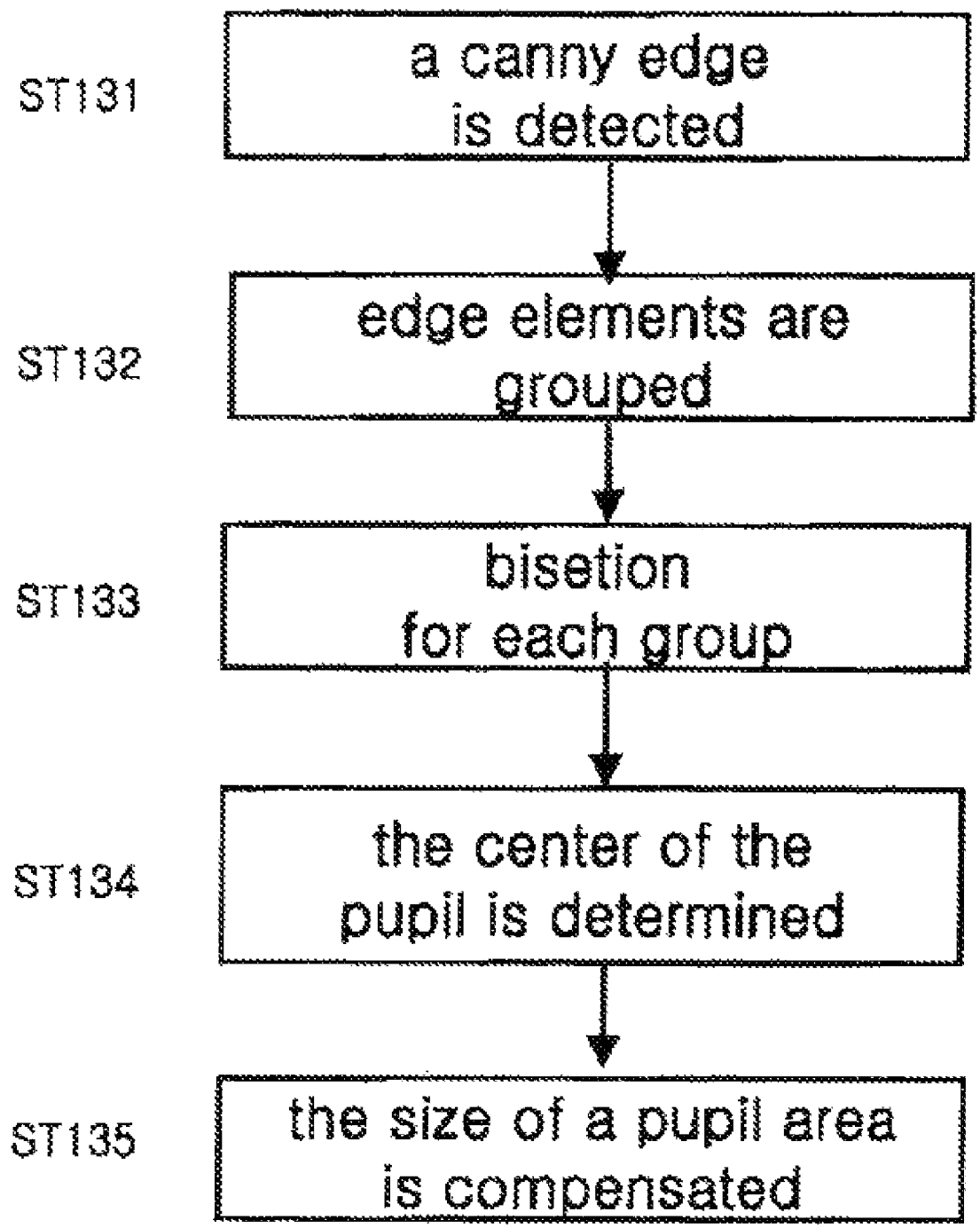
FIG. 7 is a flow chart of one embodiment for finding out an iris internal edge in accordance with the present invention.

FIG. 7 is a flow chart of one embodiment for finding out an iris internal edge in accordance with the present invention. When Canny edge detection is progressed (ST131), it is more likely that various edge lines are made than a probability that an edge line of one circle is made. Such edge lines are grouped to find various circles (ST132). With regards to the respective grouped circles, centers of each circle are found by using a bisection technique (ST133). Central points of the various circles are obtained, and a central point of an edge set which is nearest to an illumination point of the iris calculated in the aforementioned image selection step is stored as a final pupil central point of the iris calculated in the image selection step, among edge sets having the highest degree of approximation (ST134). A radius of an internal edge is found out by using the edge sets that constitute the circles, and a scale space circle is designated as the internal edge by using the radius of the internal edge derived by such a method and the final pupil central point, then the designated circle is stored (ST135). Even in case of the circle selected as the final pupil central point, it does not have a perfect circular shape before compensation of the step 'ST135', and has a distorted circular shape by image processing. Ignoring the results of the image processing, the present invention designates the final pupil central point as the center, draws the scale space circle extended as much as certain length on the radius up to the internal edge, and stores the drawn scale space circle as the internal edge.

The iris internal edge (pupil edge) in the present invention is detected by using a Canny edge detector which is a kind of an edge detection filter. The Canny edge detector comprises a process of detecting edges by using a Sobel operator after smoothing an image obtained by using Gaussian filtering.

The inputted image is Gaussian-filtered by an equation 1 to reduce a pupil edge error.

$$G(x, y) = \sigma^2 e^{\frac{x^2+y^2}{2\sigma^2}}$$

$$I_G(x, y) = G(x, y) \times I(x, y)$$ [Equation 1]

An edge line of the Gaussian-filtered image is detected by a Sobel operator of an equation 2, and the detected image is binarized through a threshold value.

$$S_X = I[i-1][j+1] + 2I[i][j+1] + I[i+1][j+1] - I[i-1][j-1] - 2I[i][j-1] - I[i+1][j-1]$$

$$S_Y = I[i+1][j+1] + 2I[i+1][j] + I[i+1][j-1] - I[i-1][j+1] - 2I[i-1][j] - I[i-1][j-1]$$ [Equation 2]

Figure 8:
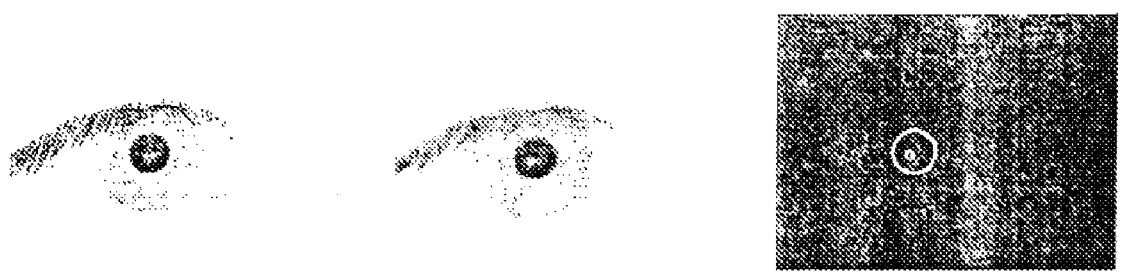
FIG. 8 illustrates a Gaussian filtered input image and an image binarized by using a threshold value after a Sobel operation.

FIG. 8 illustrates a Gaussian filtered input image and an image binarized by using a threshold value after a Sobel operation.

In this case, an edge element of the sclera and the iris, where a difference between a front view and a background of an eye image is large, is easily extracted. But, in some cases, the edge element is not easily extracted due to little difference between a background of the iris and the pupil. And, in other cases, a lot of edge elements are extracted from the sclera. Thus, a grouping unit and an iris image extractor are used to more exactly find out an edge between the pupil and the iris and an edge between the sclera and the iris. The grouping unit groups various edge elements detected from an edge element detector. Given that the extracted edge elements are described in table 1a shown below, if the edge elements are grouped together, the grouped edge elements are shown like table 1b.

TABLE 1a

| 1 | 1 | 0 |
| 0 | 0 | 0 |
| 1 | 1 | 1 |

TABLE 1b

| A | A |   |
| A | A | A |

Like above, the grouping unit binds connected pixel edge elements into each group, and in this case, arrangement in connection sequence is included. When the pupil is detected, the center of the pupil and a radius are found by using the bisection technique. Basic principles of the bisection technique are applied with a circular recognition method which is a kind of the Hough transform technique. That is, supposing that a bisection point of a straight line that connects two points A and B on a circle is C, a straight line which passes by the C and is vertical to the straight line of the A and B points always passes through the center of the circle. So, with such a method, two random points are grouped together, and it is confirmed whether straight lines that connect the points are near to one point (0). Accordingly, an edge set nearest to an illumination point among edge sets having the highest degree of approximation is determined as the center of an internal edge (pupil) of the iris, thereby improving detection speed on the center of the pupil. An equation of the straight lines OC can be expressed like equation 3.

$$y = -\frac{x_A - x_B}{y_A - y_B}x + \frac{x_A^2 + y_A^2 - x_B^2 - y_B^2}{2(y_A - y_B)} \quad \text{[Equation 3]}$$

Figure 9:
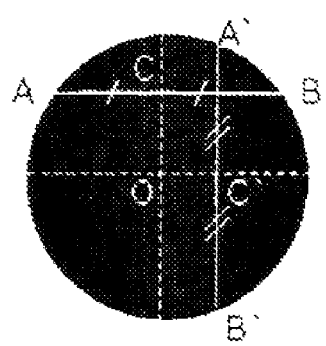
FIG. 9 is an embodiment illustrating a process of finding out the center of the pupil by using a bisection technique.

FIG. 9 illustrates a process of finding out the center of the pupil by using a bisection technique.

If an edge detection method by a Canny edge detector is used, the user's eye is positioned in slightly inclined way without turning towards a front side of a camera, thus it is possible to accurately detect an internal edge of the iris which is an edge of the pupil irrespective of the case an eye image in normal shape is not obtained. Likewise, though the shape of the pupil is defined as a circle, the circle of the pupil is mostly distorted in fact. To compensate a difference between a circular edge and a substantial pupil edge, an area of a radius is expanded as much as certain length from the substantial pupil edge. As a result, the edge of the pupil is consistent with the circular edge.

3. Iris External Edge

As detection of an external edge of an iris image is progressed in up/down/right/left directions from an edge of the pupil that is, an internal edge of the iris, maximum values among differences of pixel values are found and detected by comparing the pixel values. The detected maximum values include $\text{Max}\{I(x,y)-I(x-1,y)\}$, $\text{Max}\{I(x,y)-I(x+1,y)\}$, $\text{Max}\{I(x,y)-I(x,y-1)\}$, and $\text{Max}\{I(x,y)-I(x,y+1)\}$, and here $I(x,y)$ indicates pixel values of an image at an $(x,y)$ spot. When the external edge of the iris image is detected, the detection is progressed in 4 directions of up/down/right/left from the internal edge of the iris, and the reason to obtain the differences of the pixel values is to distinguish an internal center from an external center. Namely, when a slightly inclined iris image is inputted, the pupil may be slightly inclined to one of up/down/right/left sides. Therefore, the internal center and the external center should be differently set. If an imperfect-shaped eye image is obtained when the user's eye is positioned in slightly inclined way without turning towards a front side of a camera, a center setting process for internal and external edges of the iris is required. First, a distance to a left-sided external edge from the internal edge, a distance to a right-sided external edge, a distance to an upper-sided external edge, a distance to a lower-sided external edge, and a value of a radius of the internal edge which is an edge of the pupil are calculated. With the calculated values, a radius and the center of the iris are obtained through the bisection technique like a pupil detection technique.

Since most of iris information is concentrated on the inside of the iris (namely, a part adjacent to the pupil), the present invention uses iris information located within a certain radius on the center of the pupil as a special feature. When the feature is extracted, a feature extraction radius is determined by using radiuses of the internal and external edges of the iris. At this time, there is a good point that it is available to extract the same feature information without being affected by pupil changes or changes of iris size caused by a scale of an obtained image. It is because a feature point is extracted on a scale space circle of relative size for the size of the pupil. Also, it is possible to obtain a feature point invariable to positional changes. That is, since the center of the pupil is set to a basis, the feature point is not affected by the positional changes even though a position changes on an image plane.

4. Iris Area Normalization

According to feature extraction methods, the existing biometric verification method using the iris is largely divided into 2 types such as a method employing a 2-dimensional feature extracted from the overall iris images as a feature and a method employing a 1-dimensional feature which uses an external wrinkle shape only as a feature among iris biometric features. Since the method employing the 2-dimensional feature extracts the feature from the overall iris images, it may contain a lot of unnecessary information that does not include intrinsic pattern information of the iris, thereby resulting in a problem that it is not fast owing to a lot of image throughputs.

On the contrary, though the method employing the 1-dimensional feature has some good points that fast feature extraction is available while an amount of calculation is reduced by using the 1-dimensional feature instead of the 2-dimensional feature, it ignores all iris patterns except the external wrinkle shape of the iris, thereby increasing an incorrect recognition rate. Moreover, if the wrinkle shape of the iris is damaged, it causes a fatal problem of reliability deterioration.

To achieve the above object, the present invention considers inside patterns of iris wrinkles which are ignored in the 1-dimensional method, within a scale space circle of relative size based on the size of the pupil, and also uses iris information located in a particular radius on the basis of the center of the pupil as a feature so as to more quickly extract the feature than the 2-dimensional method.

Figure 10:
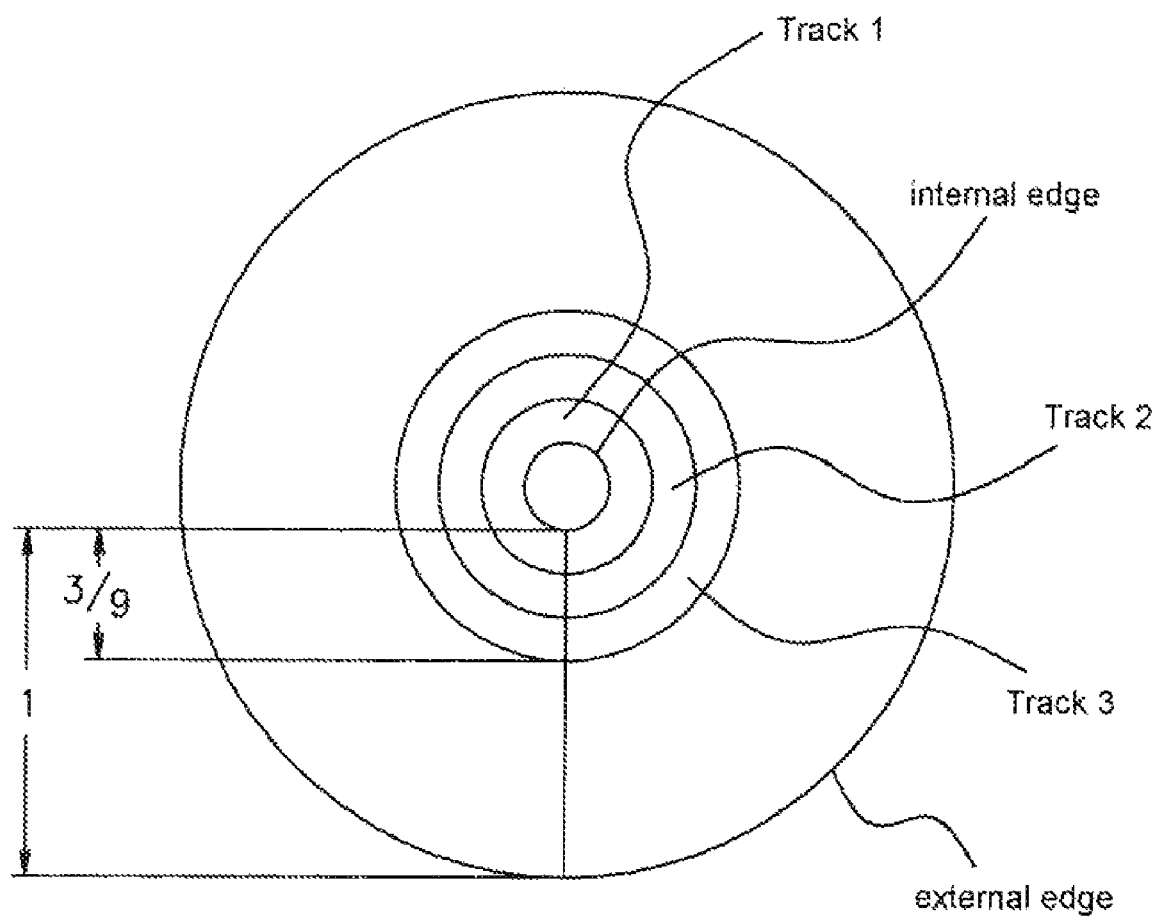
FIG. 10 is an explanatory diagram for dividing an area between an internal edge and an external edge into 3 areas in accordance with the present invention.

FIG. 10 is an explanatory diagram for dividing an area between an internal edge and an external edge into 3 areas in accordance with the present invention. On the aspects of the iris in character, an iris area nearest to the pupil contains the most information, and as the iris gets farther to an external edge area, an amount of information gets smaller. Like shown in FIG. 10, the iris area of the present invention is divided into a first track, a second track, and a third track from a track near to an internal edge, and polar coordinates conversion is performed for the divided tracks. At this moment, like shown in the drawing, areas only which are near to an internal edge area are used instead of all iris areas between the internal edge and the external edge being used. Concretely, given that a distance between the internal edge and the external edge is "1", "⅗" areas only are used between the internal edge and the external edge.

An iris image extracted from an iris image extractor is normalized in a normalizer by applying an elastic body model. The reason to use the elastic body model is became it is necessary to form the iris image configured by edging the pupil and the sclera, in a certain space. In this case, a prior condition that area relations should be consistent one to one though the shape of the image is distorted is attached, and movement when the shape is distorted should be also considered. The elastic body model consists of a plurality of elastic bodies whose one end is combined with the sclera by pin joints while other ends are combined with the pupil. And, the elastic bodies are modeled with a limited condition that the elastic bodies can be transformed in length direction without being transformed in a direction vertical to the length. With such a condition, since fixed tips of the elastic bodies are combined by the pin joints, the elastic bodies can rotate right and left. Also, the pupil is in a shape made by unfixed other ends of the elastic bodies, and a direction vertical to a pupil edge can be set to an axial direction of the elastic bodies. Iris patterns distributed in the iris image are close to each other in an area near to the pupil, and are widely distributed in an area near to the sclera. Therefore, despite a slight error in the area near to the pupil, an incorrect recognition problem is generated, and furthermore, there causes a problem of recognizing different persons as the same person in the area near to the sclera. In addition, an error may be generated owing to transformation like asymmetrical contraction or expansion of iris muscles, and if an angle for taking an eye image is inclined instead of being vertical to the pupil, an original image can be transformed. Due to such reasons, the elastic body model is applied to obtain a normalized iris image. A process of applying the elastic body model will be described in detail as follows. And, a following relation is established between the internal edge and the external edge of the iris.

$$T_o = \arcsin\left\{\frac{(Y_i - Y_{oc}) * \cos(N_i) - (X_i - X_{oc}) * \sin(N_i)}{R_o}\right\} + N_i \quad \text{[Equation 4]}$$

Coordinates of one point located in the internal edge: (Xi,Yi)
Normal vector direction in the coordinates Xi and Yi: Ni
Centers of the external edge: (Xoc,Yoc)
Radius of the external edge: Ro
Positions where elastic bodies including the coordinates Xi and Yi are pin-jointed with the external edge: (Xo,Yo)
Angle between the (Xoc,Yoc) and the (Xo,Yo): To That is, the normal vector direction (Ni) for the internal edge is calculated, and a relation between the Ni and the To is established like the equation 4. Then, as moving angles of polar coordinates in certain angular unit on the basis of a circle of the external edge, the (Xi,Yi) and the Ni for the To are calculated, and an image between the (Xi,Yi) and the (Xo,Yo) is normalized. The iris image obtained according to the above process has a strong feature against transformation caused by movement of the iris.

In a case of coordinates of iris patterns formed as (r, θ), where 'r' exists between [0,1] and 'θ' exists between [0,2π]. That the iris image I(x,y) is changed into polar coordinates is shown in equation 5.

$$I(x(r,\theta), y(r,\theta)) \Rightarrow I(r,\theta) \quad \text{[Equation 5]}$$

Here, 'θ' is increased as 1°, and 'r' is obtained by applying a distance between an external center and an internal center of the iris, a radius of the external edge, and 'θ' to a second rule of cosine. The 1° is just one example, and it can be increased at random angle. Iris patterns between the internal edge and the external edge are extracted by using the 'r' and the 'θ'.

When the iris image obtained in slightly inclined shape is converted into the polar coordinates, it can be found that a lower side of the iris image converted into the polar coordinates is bent to have an irregular shape. With regards to the distance between the internal edge and the external edge, iris patterns only for an X % part of a distance between the internal edge and the external edge of the iris image are obtained in order to acquire a large amount of iris patterns as removing interference of illumination. That is to say, the polar coordinates conversion is conducted by obtaining the iris patterns if the internal edge and the external edge of the iris are detected, but if reflected light of illumination is formed in the iris, iris patterns only which exist in a distance corresponding to 60% from the internal edge are obtained to conduct the polar coordinates conversion among iris areas reaching up to the external edge from the internal edge (edge of the pupil) of the iris.

5. Security Level

As a person gets older, symptoms (so-called cholesterol ring or sodium ring) that white rims are covered in iris rims of the eye are shown. Such symptoms are very slowly progressed over the years instead of being instantly progressed in a day or in months, and are shown in the iris of many people. And, there is no way to prevent incorrect recognition. Thus, so as to prevent this phenomenon, the present invention sets certain areas to independent areas for an iris image captured for a checkup request document, and sets an independent percentage in the set independent areas. Besides, in case original iris information is changed and iris areas are compared except the changed image information, overall areas of the iris are circularly divided by a percentage of a distance between a circular pupil edge and a circular edge between the iris and the sclera in each stage, and priority is set. Then, the divided areas are set again to have different percentages. A certain reference value is defined by a percentage for a change of the utmost outer band of the iris from the original iris information, and each part is recognized as it is up to the certain reference value, then transformation is warned of. If a certain part exceeds the certain reference value, other parts except the corresponding part are comparably recognized. If any transformation which is more than the certain reference value occurs again, outputting of incorrect recognition is defined to have a function of re-saving the original iris image information at a point of time each part is transformed and compared. In this case, priority is set after the overall iris areas are divided into circular bands up to iris and sclera edges in each stage, so that the highest priority is given to a part nearest from the pupil. And, priority is dropped up to an edge between the iris and the sclera to give the lowest priority to an outer part which changes the most. Thus, as the number of compared targets increases, bands of the compared targets increase too, thereby adjusting a security level by controlling matching threshold values.

Figure 11:
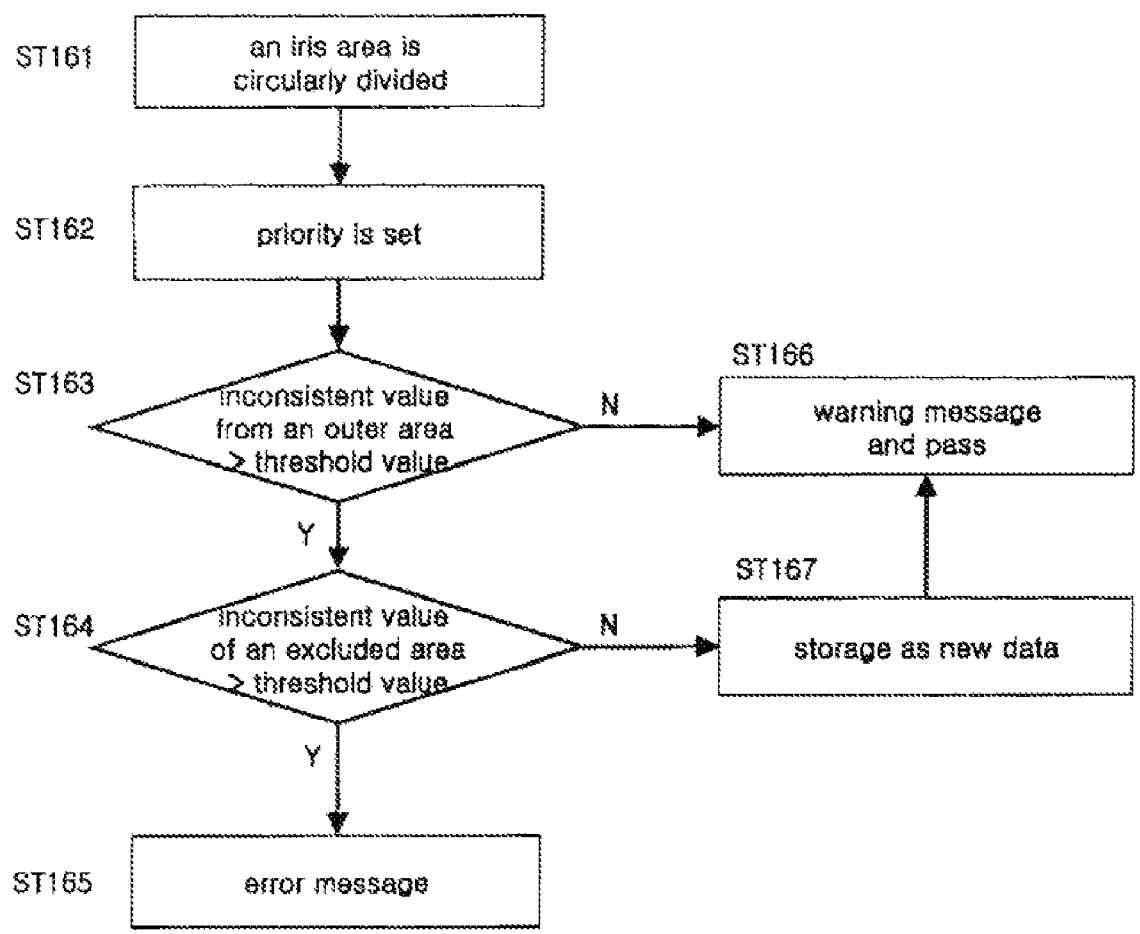
FIG. 11 is a flow chart illustrating an application step of a security level in accordance with the present invention.

FIG. 11 is a flow chart illustrating an application step of a security level in accordance with the present invention. An iris area is divided into various tracks like shown in FIG. 10 (ST161), and priority is set, for instance, weight is applied to each track (ST162). In other words, high priority is given as a track gets near to the pupil, and the lowest priority is given to an outer part since the outer part changes a lot. A degree that a track part with low priority is inconsistent is decided by using a threshold value (ST163). If the track part is consistent with the threshold value as a result of the decision, a degree that the iris is consistent is displayed and finally, iris consistency is decided (ST166). If inconsistency is decided as the result of the decision, it is decided whether the rest of the tracks are consistent except the track part with the low priority (ST164). If not, an error message is delivered and finally, a conclusion of inconsistency is reached (ST165).

If the rest of the tracks are consistent except the track part with the low priority even though the track part with the low priority is inconsistent, currently recognized iris data is stored as new data (ST167), and a degree that the iris is consistent is displayed, then finally, a conclusion that the iris is consistent is made (ST166).

6. Rotated Image

When an iris image is obtained, the user's head can be slightly inclined right and left, and if the iris image is obtained in this state, a rotated image can be acquired. In other words, if the obtained eye image is captured in a shape rotated at a random angle in a central line of the eye image, a process for compensating the rotated image is necessary. If the iris image which is rotated at approximately 10 degrees to the top and approximately 10 degrees to the bottom in the central line of the eye image is converted into a polar coordinates system, the image is shown in a state of being moved right and left as much as rotated distance compared to a shape of normal iris patterns. The iris image rotated by the inclination of the user's head moves at random angles on the basis of an array (0) of the iris image converted into the polar coordinates, and temporarily generates a plurality of arrays (n). Namely, based on the array (0) of the iris image converted into the polar coordinates, the image moves on columns right and left from the array (0), thereby temporarily generating 21 arrays of image information up to the array (−10) from the array (0) and to an array (10) from the array (0). That is to say, the generated arrays become rotated image data. Since brightness data of the iris is acquired along a circle, the brightness data acquired along the circle becomes a periodic function having periods as many as the number of pixels in circumference wherever a starting point is located. Feature vectors of the iris corresponding to the temporarily generated iris images are individually compared with pre-registered feature vectors to obtain a consistency rate, and a random feature vector where the obtained consistency rate is shown as a maximum value is recognized as an iris feature vector of the user.

In this case, to search a degree of rotation at high speed, the present invention compares a 1-dimensional feature only in a place corresponding to a first radius band instead of comparing overall iris codes. It is because the 1-dimensional feature is rotated together with each band once the iris is rotated, thus it is possible to compare the feature in one band only.

Figure 12:
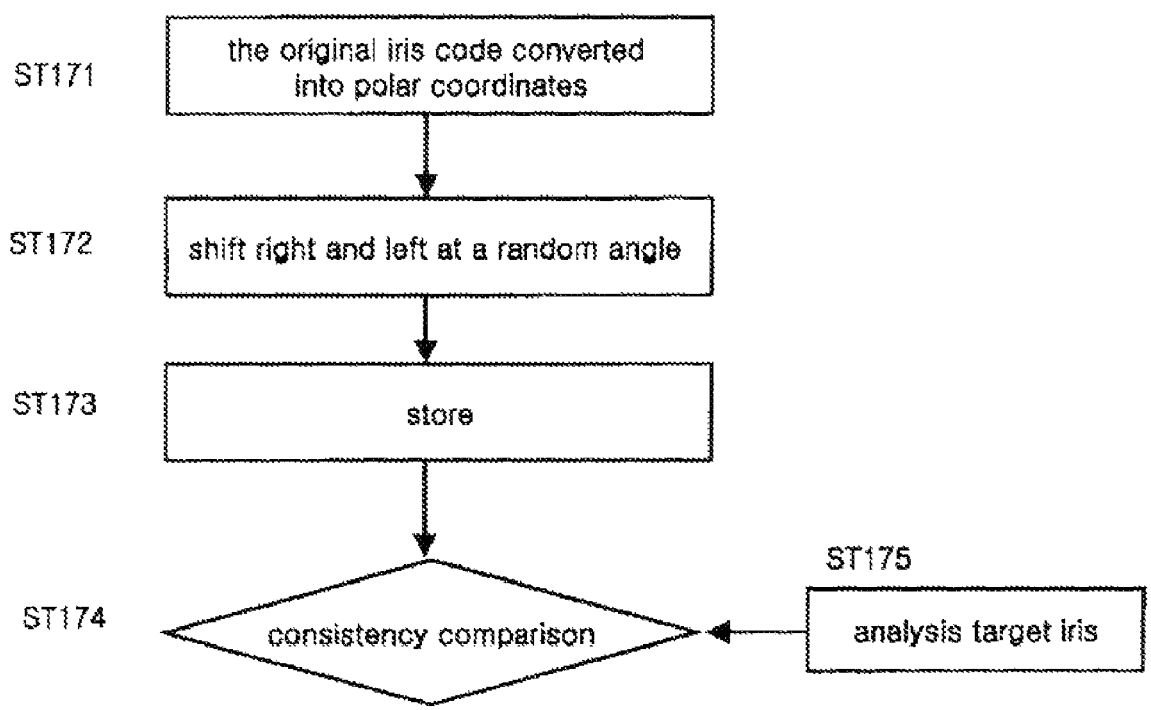
FIG. 12 is a flow chart for processing a rotated image in accordance with the present invention.

FIG. 12 illustrates a flow chart for processing a rotated image in accordance with the present invention. Once an original iris code is defined according to the present invention (ST171), the rotated iris code is calculated. The one iris code used in the present invention is formed by sequentially storing information on tracks 1, 2, and 3 in 1-dimensional manner.

For example, in order to preserve an iris code rotated in 1-degree unit for an image rotated in ±15 degrees right and left, the total amount of 21 iris data should be preserved for one iris code. Since the iris code is converted into polar coordinates, an iris code rotated, as +1 degree is stored by being shifted to the left from an original code 1 pixel by 1 pixel, and an iris code rotated as −1 degree is stored by being shifted to the right from the original code 1 pixel by 1 pixel (ST172, ST173). If the iris which inquires about whether pixels are consistent is inputted outside through an image input device by using the stored iris codes (ST175), the inputted iris is compared with the stored 21 iris codes in total to decide on consistency of the pixels (ST174). At this time, the present invention can easily decide on the consistency by comparing data only of a first track part in the 21 iris codes, rather than deciding on the consistency of all pixels which constitute one iris code.

7. Feature Value Extraction Using Daubechies Wavelet Packets

Figure 13:
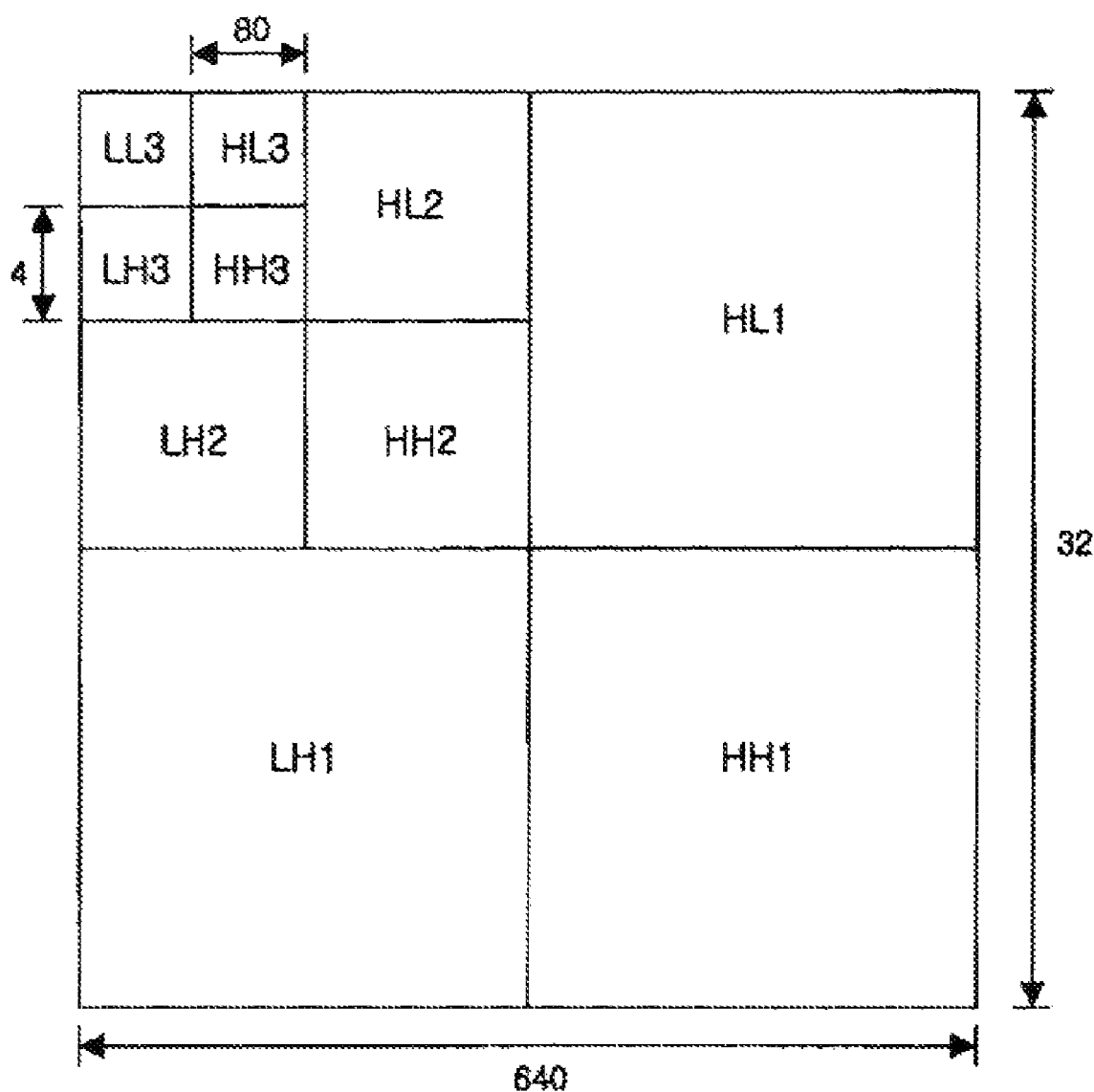
FIG. 13 illustrates a Daubechies wavelet transform table.

Wavelet transform is used as a feature extraction method for an iris image, and this wavelet transform is a kind of a technique that interprets a signal in multi-resolution. Wavelet is a mathematical theory for making a model for a signal and a system or a series of such processes by using a specially selected signal, and in this case, the specially selected signal is called a little wave or wavelet. Since the wavelet is rapid and effectively realizes localization of a signal in time and frequency domains compared to an existing signal processing algorithm based on Fourier transform, it is widely applied to signal and image processing fields in recent years. Meanwhile, iris patterns only are extracted from an iris image obtained by an image acquisition equipment to extract a feature value of an image, for instance, which is normalized in 640×32 size by using wavelet transform. Harr wavelet transform was used a lot for existing iris recognition or image processing, but a Harr wavelet function has a weak point that values rapidly change in discontinuous way, and when an image is restored again after being compressed, it is hard to obtain a high-resolution image. On the contrary, a Daubechies wavelet function is a continuous function, thus it can extract a more exact and delicate feature value by complementing the weak point of the Harr wavelet function. Consequently, when the image is restored again after being compressed by using the Daubechies wavelet function, the image can be restored in high resolution nearer to an original image than when the Harr wavelet is used. However, since the Daubechies wavelet function is more complicated than the Harr wavelet function, there is a shortcoming that an amount of operation gets increased when the Daubechies wavelet function is used. But, it can be overcome thanks to recent emergence of an ultrafast microprocessor. FIG. 13 illustrates a Daubechies wavelet transform table. An iris image has an energy value where the lowest frequency domain and a horizontal domain are roughly large. Thus, the present invention employs an LL3 area and/or an LH3 area with high energy. At this time, since HH3, HH2, and HH1 high-frequency parts with low energy are used in the prior method, a feature vector where a number exceeding "0" is converted into "1" based on "0" value and a number not exceeding "0" is marked as "0" is generated. But, it is impossible to generate a feature vector in such a way for some parts used in the present invention, which has high energy. So, the present invention applies a method for generating the feature vector as "1" if front and back pixel values are increased by comparing the pixel values, and for converting the feature vector into "0" if the pixel values are decreased.

The above Daubechies wavelet transform has an advantage of acquiring a delicate feature in the process of performing wavelet transform for feature extraction. That is to say, when the Daubechies wavelet transform is used, feature expression of the iris is available in low capacity, and also exact feature extraction is possible. In the existing iris recognition fields, methods for extracting features and configuring vectors by using Gabor transform are mainly used. However, feature vectors generated by such methods are configured in more than 256 dimensions, thereby occupying more than 256 bytes to a minimum even though it is supposed that one byte is occupied per dimension. Therefore, it causes problems that feasibility and effectiveness are deteriorated when the above methods are applied to a certain field that requires low-capacity information. Accordingly, the need for a configuration method of a low-capacity feature vector, which can effectively process, store, transmit, and search pattern information, has been on the rise.

When a Daubechies wavelet is used among various mother wavelets and a low-frequency component is displayed L while a high-frequency component, is displayed H, it means that an LL part is a component passing through an LPF (Low Pass Filter) in both x and y directions and all HH parts are components passing through an HPF (High Pass Filter), and that subscript numbers are image dividing steps. For example, in case of LH2, it passes through an LPF in x direction and passes through an HPF in y direction during 2-step wavelet division.

For an inputted iris image, the iris image is divided into multiple images by applying Daubechies wavelet transform. Since the iris images can be considered as 2-dimensional signals where 1-dimensional signals are arrayed at x and y axes, the images pass through the LPF and the HPF in x and y directions, respectively, to analyze the signals, thereby extracting four divided components for one image. In other words, wavelet transform is performed in width and length, respectively, for 2-dimensional image signals, so as to divide into four LL, LH, HL, and HH areas for one-time wavelet performance. At this moment, the signals are divided into a difference component D (Difference) of a signal which is a component passing through the HPF and an average component A (Average) of a signal which is a component passing through the LPF through Daubechies wavelet transform.

Areas (HH) that include all high-frequency components only for the x and y axes are extracted from the divided iris images. The repeated number of times is increased during the division of the iris images, and a processing procedure is terminated if the repeated number of times is larger than the designated number of times. On the contrary, if the repeated number of times is smaller than the designated number of times, information of the HH areas is stored as information for feature extraction. Besides, an area (LL) that includes all low-frequency components only for the x and y axes is extracted from the multiple-divided images. Since main information of the images is contained in the extracted LL part (image reduced in ¼ size compared to the overall images), the image is provided as a new processing target image so as to apply the wavelet to the corresponding part, thereby repeatedly conducting the Daubechies wavelet transform again.

Because wavelet packet transform applied with such Daubechies wavelet transform provides affluent wavelet bases, effective resolution is available once a base appropriate for space-frequency characteristics of an iris image is selected. Therefore, resolution is possible according to the space-frequency characteristics of the iris image which contains a lot of important information, even in high-frequency bands as well as low-frequency bands.

In the present invention, such a wavelet process is repeated 3 times in total to analyze the previously obtained iris image, and as a result, the LL3 image reduced in 80×4 size like the following drawing is finally obtained. Also, because an original image can be restored on the basis of the LL3 component and the rest of the HL3, LH3, and HH3 components, it is possible to say that even the reduced image contains information of an original image signal.

The number of times of wavelet transform is repeated in order to decrease the size of information, and the proper number of times is defined into 3 times by synthetically considering an information loss problem and a speed problem.

General Daubechies wavelet extracts a feature point based on a high-frequency domain, but if a feature vector is configured by extracting iris features intended for all areas, some areas that contain unimportant information may be used, resulting in deterioration of a recognition rate and inefficiency of processing time as well. Hence, it is considered that an area having a high energy value contains much feature information, and a feature area extractor extracts an area only which is larger than a reference value. In an iris feature area where wavelet transform is applied 3 times, it is supposed that the LL3 and HL3 parts have larger energy values than the reference value. In this case, the LL3 part is extracted as a feature area of the iris and is stored. The extracted and stored area is divided into various sub areas to obtain averages and standard deviations of each sub area, and then a feature vector is configured on the basis of a random threshold value by using the averages and the standard deviations. Consequently, it is possible to extract a feature point which is less influenced by peripheral illumination.

8. Matching (Similarity Comparison)

Once a feature of an image signal is extracted, a feature vector is generated through the extracted feature. A feature value is extracted in a type of a real number, and this value is converted into a binary code of 0 and 1 via a process like equation 6 in each dimension, thereby generating the feature vector.

$$f_n = 0 \text{ if } f(n+1) - f(n) < 0$$
$$f_n = 1 \text{ if } f(n+1) - f(n) \geq 0 \quad \text{[Equation 6]}$$

f(n): feature value of an nth dimension
$f_n$: nth feature vector value

In the prior art, a simple distance measurement method such as HD (Hamming Distance) between two feature vectors (feature vector for inputted patterns and stored reference feature vector) is used to classify patterns. So, configuration of a reference feature vector through generalization of pattern information is not easy, and characteristics of information that each dimension of the feature vector has are not properly reflected. That is, in case of the method using the hamming distance to verify the two feature vectors generated as binary vectors, bit values allocated to each dimension are compared together, and 0 is returned if the bit values are the same while 1 is returned if the bit values are different, then the bit values are divided by the total number of dimensions to show final results. It is a simple and useful method to decide on a degree of consistency of the feature vectors formed as the binary codes. In case of the same data when the hamming distance is used, compared results of all bits become 0. Thus, as the results are near to 0, it is known that the data belongs to the user himself or herself. If the data belongs to another person, it is probable that the degree of the consistency is shown 0.5. Accordingly, it is known that a value is concentrated on the vicinity of 0.5 in comparison with the data of another person. Hence, when an appropriate edge value is set between 0 and 0.5, it becomes an edge for distinguishing the data of the user himself or herself from the data of another person.

9. Fake Detection

A decision basis of the fake detection is to decide whether the pupil of the eye is changed by illumination. In other words, it is checked whether the area of the pupil is changed at more than a certain value by lighting on and off of a lamp which irradiates a certain intensity of illumination, thereby deciding that the actual pupil is taken if the area of the pupil is changed at more than the certain value, and deciding that the eye on a fake material such as a photo is taken if the area of the pupil is not changed at more than the certain value.

Thus, the area of the pupil is obtained from an image of the eye taken while the lamp is off, and the area of the pupil is obtained from the image of the eye taken while the lamp is on, then it is compared and decided whether a difference between the obtained areas is more than a certain value.

Once the respective areas (A) and (B) are obtained, it is confirmed whether a difference value (A−B) between the areas is more than a threshold value (T), and if so, it is decided that the eye of an actual person is taken, and if the difference value is less than the threshold value, it is decided that the eye on a fake material is taken.

However, this method should repeat a series of operations for searching a position of the pupil and obtaining a radius of the pupil in order to detect contracted and expanded states of the pupil. Moreover, it should apply detection technology of dynamic image changes, that is, it has to obtain iris images which are continuously taken in at least more than 3 pictures so as to examine contraction and expansion of the pupil, and pass through the above analysis work for the iris images. Due to this problem, it takes a long time for deciding on a fake iris, consequently, real-time processing is difficult and an error may be included in pupil and iris extraction performance itself to some extent. Accordingly, since size changes of the pupil cannot be exactly found out, there still exists a probability of incorrect recognition.

In the meantime, a method using 2-dimensional Fourier spectrum analysis for an iris image employs detection of a characteristic frequency component that a printed iris image has, and generally, when the iris image is outputted by using a printer, this method picks out a fake iris by extracting printed noise components through frequency analysis in consideration of the fact that the printed noise components are included to some degree. In case of a printed material of an eye image (iris image), 4 regular high-frequency characteristics can be found out by the printed noise components through Fourier spectrum analysis on the printed material. That is, since the printed noise components have directivity and periodicity by characteristics of the printer, regular high-frequency components are shown once the printed noise components are analyzed in frequency domains through the Fourier spectrum analysis, and it is decided that the corresponding iris image is faked when such high-frequency components are shown.

However, this method also makes real-time processing difficult because it takes a lot of time for the Fourier spectrum analysis, and even in case of an actual eye image where a lot of eyelashes are included in the inside of the iris, similar high-frequency components to the above printed fake iris image are detected, thus a probability of incorrect recognition is high.

In addition, as a method for deciding on the fake iris, there is a method for measuring reflected positional changes of illumination in the cornea, or a method for measuring a degree of infrared reaction, but actually, there is a very high probability of considerable restrictions, hardware and software burdens, and incorrect recognition to exactly discriminate the real eye of a person from the fake eye.

The present invention decides on the fake iris based on a brightness variation of the pupil part by obtaining pupil and iris images from an eye image. Generally speaking, the pupil of a human being is covered with the cornea including crystalline lens and aqueous humor in front of the pupil; however, the inner part is in a pierced structure which is a kind of black hole. Thus, even when brightness of an image inputted from a camera is controlled, a brightness variation of the pupil part is not largely shown. So, based on this property, the actual eye of a person and the fake eye are distinguished from each other.

There may be various methods for obtaining the brightness variation of the eye image. One of the methods is to measure a brightness variation of the pupil part from a difference image between 2 sheets of eye images by driving lighting equipment of different brightness and by obtaining the 2 sheets of the eye images at predetermined time differences. Another method is to obtain 2 sheets of eye images of different brightness by controlling brightness, contrast, and shutter speed in the camera itself, and to measure a brightness variation of the pupil part from a difference image between the eye images. Also, another method is to obtain 2 sheets of eye images of different brightness by controlling brightness and contrast on an image capture board for an image obtained with the camera, and to measure a brightness variation of the pupil part from a difference image between the eye images.

Namely, a variation of the pupil in accordance with brightness changes shows a relatively small characteristic in the actual eye of a person, and it is possible to sort out a fake iris based on the brightness variation by using such geometrical characteristics of the pupil.

Accordingly, it can reduce time for deciding on the fake iris, carry out iris recognition in almost real time, and apply each piece of feature information that includes the brightness variation of the pupil to a decision step, thereby making more reliable fake iris decision possible.

10. Encryption System

On the whole, iris recognition technology (biometrics) uses the iris which reflects peculiar features of a person for personal identification, and is being widely used in a lot of fields that should maintain high security levels thanks to advantages that irises are different from each person and are not largely changed through life as well as high accuracy of the iris recognition technology.

Here, intrinsic iris codes indicate intrinsic code information which is unvarying for each person as being extractable from distorted iris input data where noise is included, and such intrinsic iris codes can be applied to various fields for key protection purposes in an encryption system or as substitutes for passwords.

As for a personal password, a method for the user himself or herself to additionally input about 8 digits of a password after directly inputting a user name is used in most of the present systems. This personal password is currently applied to various fields such as financial transactions, computer log-in, etc. Recently, as an amount of cyber information transactions gets larger, types of passwords that each person should remember are gradually increased, and when an easy-to-remember number (for example, 1234) is made or a password is adopted from personal information (home phone number) to simplify the types of the passwords, it can cause a serious security problem. Hence, by substituting the intrinsic iris codes suggested in the present invention for passwords, it is available to enhance security without the user individually remembering various types of passwords.

Most of the present encryption systems are largely divided into two types such as a symmetric key infrastructure and an asymmetric key (public key infrastructure). In case of the former, the same key is used for both encryption and decryption, and in case of the latter, a public key generated from a private key is used for encryption while the private key is used when decoding is conducted for encrypted data. Protection of a key to be used for decryption is an important problem for both symmetric key method and asymmetric key method. And, in most of the currently used methods, it is known that keys are preserved in secret places (inside of program codes or CPU registers) of the inside of a computer. However, the preserved keys can leak at any time by intelligent hackers, and in this case, decryption for encrypted data is freely executed, resulting in a very serious security problem.

Therefore, when such keys are dynamically generated by the intrinsic iris codes without being separately preserved in the computer, it can solve a lot of security problems generated during key preservation.

By the way, an iris recognition method can be directly used for substituting such passwords or preserving encryption keys. That is to say, it is available to use a method for generating intrinsic iris codes prestored for each person once the user is certified after user authentication is conducted from the currently inputted iris data.

In such a case, pre-registered iris information and intrinsic iris code information should be contained in an encrypted structure, and at this moment, if key information used for encryption leaks, registered iris data and some degrees of intrinsic iris codes may easily leak even though the encryption is perfectly executed.

To solve the above problems, there may be a method for dynamically generating intrinsic iris codes from the currently inputted iris data without storing iris data or the intrinsic iris codes.

As an example for such a case, a Bioscript company has suggested a secure-key protocol method called 'bioscript'. In this type, a method for making concealment of an encryption key as well as concealment of biological information possible by using random phase information is used without directly storing the biological information.

On this occasion, a filter formed on the basis of biological information of each person is used for concealment, that is, when the biological information of each person is inserted as input of the filter, intrinsic iris codes are obtained as output of the filter.

At this time, since it is impossible to extract biological codes or biological information stored inside from the filter without input for the biological information of each person, high-level security can be maintained.

A problem of such a bioscript method can be generated in terms of substantial realization. In other words, the secure-key protocol of the bioscript uses a method of performing extraction of an encryption key by storing position information of each bit in a type of a lookup table from output of a binarized filter. Therefore, to make such a method valid, a spatial position of iris information used for filter generation should be exactly consistent with a spatial position of iris information of each person, which is inputted to obtain intrinsic iris codes.

However, as for a substantial biometric system, a translation of inputted data happens whenever iris data is inputted for each person, and to solve this problem, the bioscript method employs a process of searching a spot where iris information used for a filter and a position of the inputted iris information are matched together, through 1 pixel-unit shift and matching.

Yet, such a process basically requires a lot of operations, and as a consequence, it causes a considerable increase of processing time. Besides, in case substantial iris data is obtained, rotation changes, scaling changes, brightness changes, and nonlinear distortion caused by properties of optical systems may additionally occur. Thus, in this case, the problems cannot be solved with only the simple shift and matching method of the bioscript.

10-1. Configuration of an Encryption System in Accordance With the Present Invention and Description Thereof It is possible to generate intrinsic iris codes for each person irrespective of variations of inputted iris data. Namely, intrinsic iris code hash values are designed to enable types of predetermined patterns (private keys) to be outputted from input of various iris data according to each person after the random predetermined patterns for each person are allocated, and the designed intrinsic iris code hash values are allocated to each person, then unvarying iris codes intrinsically allocated to each person are obtained when personal iris data are given as input, through the intrinsic iris code hash values allocated to each person.

Figure 14:
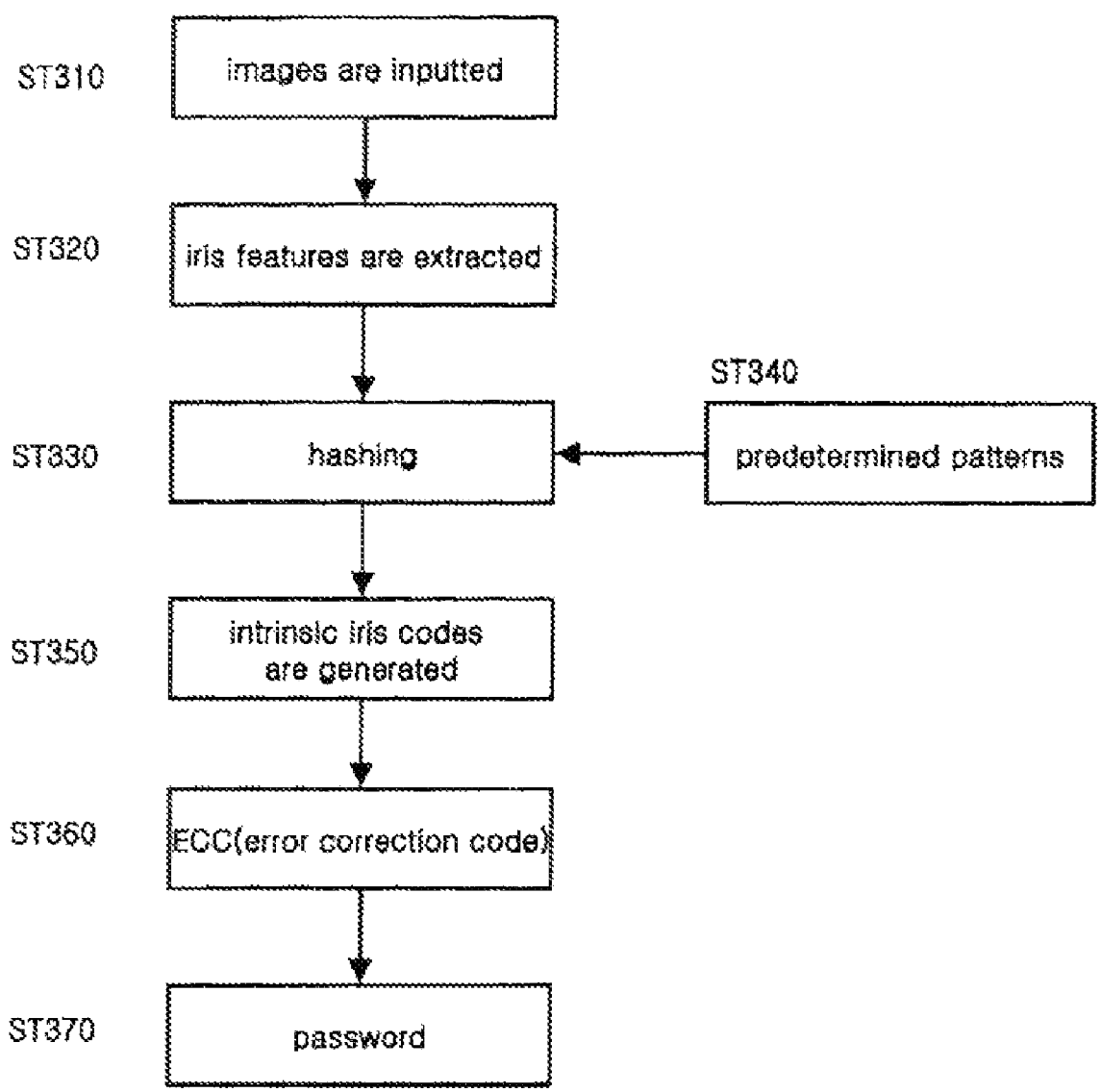
FIG. 14 is a flow chart of an intrinsic iris code extracting process of an encryption system of one embodiment in accordance with the present invention.

FIG. 14 is a flow chart of an intrinsic iris code extracting process of an encryption system of one embodiment in accordance with the present invention. When iris images for each person are inputted (ST310), iris feature codes are extracted by using the steps 'ST110 to ST160' of FIG. 2 (ST320). To be sure, a module suggested in FIG. 3 is used as a module for processing the iris feature codes.

Hashing for extracting the intrinsic iris codes is performed by using predetermined patterns (private keys) together with the extracted iris features (ST330 and ST340), During the performance of the hashing, it is available to select and use a hash value indicative of the smallest error, rate 'FRR' (False Rejection Rate: probability that an intrinsic iris code allocated to the user himself or herself is not obtained) or 'FAR' (False Acceptance Rate: probability that the intrinsic iris code of the user himself or herself is obtained by another person) after various hash values are obtained from iris data for each person.

Besides, during the generation of the intrinsic iris code hash values, it is possible to select one of or plural iris data of the best quality to use the selected data for generating the hash values among the iris data for each person.

During the generation of the intrinsic iris code hash values, a filter is generated on the basis of iris codes extracted from a spatial domain, a frequency domain, or a scale domain instead of the spatial and frequency domains.

The predetermined patterns (private keys) can be designated in a type of one, two or third dimensional arrays, and can be shown as a set of small areas or unit areas of certain unit length. In other words, the predetermined patterns can become certain sectors or tracks, or can be determined by a band pass watermark filter.

In order to lower an error which may be generated during data transmission, an ECC (Error Correction Code) encryption process is performed by conducting an exclusive OR operation for the iris codes and the intrinsic iris code hash values (ST360), then a password is generated (ST370).

The exclusive OR operation is characterized by returning to itself, once the exclusive OR operation is conducted twice. At the conclusion, an exclusive OR operation is performed for an ECC value and an intrinsic iris code hash value for processing a unilateral function operation to store user biometric information to be finally stored in a database.

Figure 15:
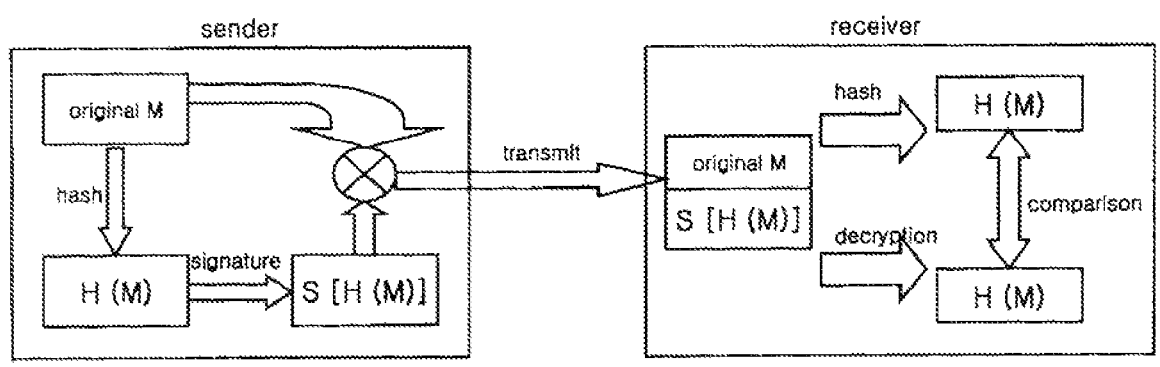
FIG. 15 is a flow chart of a digital signature using hash algorithm.

FIG. 15 is a flow chart of a digital signature using hash algorithm. When an iris code (the original M) is extracted from an inputted high-quality iris image, a message digest (H(M)) of the extracted iris code is obtained through a hash function which is a one-way function. This message digest is a kind of a digital signature, and is used for examining integrity of the original copy later. A receiver receives the message and confirms whether the message is not changed on a middle path, by the message digest.

Result values of the message digest are encrypted (S[H(M)]) into the predetermined patterns (private keys) to carry out a digital signature process. This digital signature is attached to the original copy and transmitted (including a certificate) to the receiver. At this time, a public key is included in the certificate.

The receiver receives the message, and separates the digital signature. The receiver decrypts the digital signature with the public key, and restores the original message digest. Lastly, the receiver compares a new message digest obtained by the receiver himself or herself with the message digest obtained from the digital signature. If the digests are the same, the receiver can be convinced of the fact that the original is not changed during transmission and that the signature is attached with a digital signature generation key.

Efficiency can be increased by signing data, where a message is compressed with a hash function during the digital signature. An algorithm such as RSA used for the digital signature is conducted at lower speed than the hash function in case the message itself is encrypted. Thus, it is possible to reduce an amount of calculation of the digital signature algorithm by digesting the signature with the message hash function. The RSA algorithm uses two large decimals (generally, numbers which are more than 140 places). Through multiplication and an additional operation of the decimals, one of the decimals constitutes a public key while the other constitutes a private key. In this case, operations for inducing a numeric system of used two sets are accompanied. Since it takes more than ten thousand years even with a super computer to decrypt a code of the private key, the RSA algorithm is applied to almost all of the fields as an example of a public key encryption method. However, it has a disadvantage of a lot of calculations. Though an amount of calculation is different from the number of bits, the user should wait for about 20 seconds shortly and even for several minutes in prolonged way to make a public key and a private key in a Pentium computer. Also, a lot of calculation is required for decryption, thus it is hard to be used in a portable terminal. But, to solve the above problem, an oval curved algorithm has been recently developed.

Accordingly, when certain sectors and tracks of a previously generated iris area are used without separately calculating a predetermined pattern (private key) and a public key, an amount of calculation can be reduced, thereby realizing a high speed. Likewise, it can be improved by using features of iris data that the iris itself is random and has a lot of feature points.

Moreover, a private key and a public key should be in pairs. For instance, in case the iris is divided info certain tracks, a code existing at a particular angle (sector) of a first track is defined as a private key while a code existing at a particular angle (sector) of a second track is defined as a public key, so that the user can use the private key and the public key by transceiving the codes. On this occasion, it is almost impossible to equally fake iris codes since the iris codes vary in scale as changing during shift and rotation.

That is, a sender obtains a hash value of a message, attaches a digital signature to the hash value with a self secret key, and sends the message and the signature. A receiver hashes the message with the same hash function, and compares the message with a hash value obtained by decrypting the digital signature with a public key, to authenticate the signature.

Furthermore, in order to lower an error which may be generated during data transmission, an ECC (Error Correction Code) encryption process is performed by conducting an exclusive OR operation for iris codes and intrinsic iris code hash values. An ECC is a technology for increasing reliability of data by sending data after attaching some data which confirms whether any problems are generated from the transceived data. The ECC is a code capable of detecting or modifying an error by adding certain redundancy to inputted data.

The exclusive OR operation is characterized by returning to itself, once the exclusive OR operation is conducted twice. At the conclusion, an exclusive OR operation is performed for an ECC value and an intrinsic iris code hash value for processing a unlateral function operation to store user biometric information to be finally stored in a database.

Iris code XOR intrinsic iris code hash value=ECC value

ECC value XOR intrinsic iris code hash value=iris code

In addition to a form applied with the above method, intrinsic iris code hash values can be differently designed by varying a reflection method of iris feature information or a combination method between predetermined patterns and iris information.

10-2. Effect of An Encryption System in Accordance With the Present Invention

Like mentioned so far, an intrinsic iris code extracting method in accordance with the present invention extracts unvarying intrinsic iris codes for each person from distorted iris input data where noise is included, and in this case, the intrinsic iris codes indicate unvarying intrinsic code information for each person which is extractable from the distorted iris input data where the noise is included, then such intrinsic iris codes can be applicable to various fields as substitutes of individual passwords or for key protection purposes in encryption systems.

In addition, the intrinsic iris codes provide high security on the aspect that the intrinsic iris codes can be generated by only inputting iris data of each person. And, compared to the existing intrinsic iris code generation method, it is stronger against shift, rotation, scaling, and brightness variations as well as distortion, and is more superior to the existing method in terms of processing speed or accuracy.

Likewise, in case the present invention is applied to a password system of a general financial system, a password is not open to the outside while it is accessible by only iris information of a person, thus it can basically prevent peculation or burglary. Furthermore, when the present invention is used in combination with the existing smart card technology, a more stable application is available.

Besides, when the present invention is applied to the existing security system which requires personal physical access, it can prevent iris information from leaking since the iris information is not directly stored.

In order to exactly conduct iris recognition, operations for selecting an optimum image among plural images inputted from an image input device should be preferentially conducted. In the prior art, since iris areas are extracted by only using brightness values of images, there exists a lot of influence by brightness of illumination, resulting in considerable errors during edge extraction in accordance with a degree of brightness. Consequently, accurate iris area extraction is impossible. However, in case of the present invention, the number of pixels that constitute the pupil part and the illumination part within the pupil is counted by using a mask, thus the user can select clearer images.

Also, in the present invention, since a circle of a scale space radius is drawn by using a final pupil central point calculated in an internal edge extractor, an internal edge and an external edge are extracted. Accordingly, it can reduce iris recognition time.

Moreover, in the present invention, because a rotated iris image is stored and an iris code only corresponding to a track 1 is compared without comparing all data which constitute each iris code, it can save time required for iris recognition. Also, a new method for recognizing a fake iris is suggested to improve reliability.

In the drawings and specification, there have been disclosed typical preferred embodiments of the invention and, although specific terms are employed, they are used in a generic and descriptive sense only and not for purposes of limitations, the scope of the invention being set forth in the following claims.

The invention claimed is:

1. An iris recognition system, comprising:
 an image selector for selecting an image in a best state from a plurality of iris images inputted from an image input device;
 an internal edge extractor for extracting an internal edge of the selected iris image;
 an external edge extractor for extracting an external edge of the selected iris image;
 an iris area normalizer for normalizing an iris area;
 a security level applier for securing the iris which increases according to age;
 a rotated image processor for processing an inclined iris image;
 a feature value extractor for extracting a feature value from the iris image; and
 a consistency decider for comparing the extracted feature value with a stored iris code to decide whether the compared feature value and iris code are consistent,
 wherein the image selector is operable to scan an inputted iris image in pixel unit by using a mask defined into a second area which is in square shape and a first area configured as the peripheral girth of the second area, calculate a first number of pixels located in the first area for which a luminance value is smaller than a first threshold value and a second number of pixels located in the second area for which a luminance value is greater than a second threshold value, and select an image for which the second number of pixels is minimized.

2. The iris recognition system of claim 1, wherein a central point of the second area of the selected image is designated as an illumination point, and
wherein the internal edge extractor is operable to form one or more circles by grouping calculated plural edge lines as progressing Canny edge detection, search centers of each circle by using a bisection technique for each circle, designate a center nearest to the illumination point as a final pupil central point among centers which are adjacently gathered together, and store an edge constituted by a scale space circle from the final pupil central point as an internal edge, by using a radius of a circle selected as the final pupil central point.

3. The iris recognition system of claim 2, wherein the external edge extractor stores an edge line that constitutes a scale space circle at the final pupil central point as an external edge.

4. The iris recognition system of claim 3, wherein the iris area normalizer is characterized by using iris information existing within a certain radius at the final pupil central point as a feature and by applying an elastic body model so that the elastic body model can prevent transformation caused by movement of the iris, thereby normalizing the iris area by using some areas only of doughnut shapes between the internal edge and the external edge.

5. The iris recognition system of claim 4, wherein the iris area normalizer is configured to divide some areas of the doughnut shapes into at least 3 doughnut shapes in 1, 2, and 3 track sequence which is the nearest doughnut shape sequence to the internal edge at the final pupil central point, and normalize the divided areas.

6. The iris recognition system of claim 5, wherein the security level applier is configured to allocate high weight to the track 1.

7. The iris recognition system of claim 5, wherein the rotated image processor is configured to form the stored iris code into a plurality of formed iris codes with values shifted right and left for an angle inclined right and left by using the stored iris code normalized by the iris area normalizes, store the formed iris codes, 1-dimensionally store the formed iris codes in 1, 2, and 3 track sequence, and compare only the formed iris code stored in track 1.

8. The iris recognition system of claim 1, wherein the feature value extractor is configured to use an LL3 part having the biggest energy value among Daubechies wavelet packets.

9. The iris recognition system of claim 1, further comprising:
a fake iris decider for determining whether an iris is fake by comparing a difference between feature values of irises of two images taken by differentiating the intensity of illumination.

10. An iris recognition system, comprising:
an image selector for selecting an optimum image from a plurality of iris images inputted from an image input device;
an internal edge extractor for extracting an internal edge of the selected iris image;
an external edge extractor for extracting an external edge of the selected iris image;
an iris area normalizer for normalizing an iris area;
a security level applier for securing the iris which increases according to age;
a rotated image processor for processing a rotated iris image; and
a feature value extractor for extracting a feature value from the iris image,
wherein the iris area normalizer is configured to divide some areas of doughnut shapes into at least 3 doughnut shapes in 1, 2, and 3 track sequence which is the nearest doughnut shape sequence to the internal edge at the final pupil central point, and normalize the divided areas; and
at least one of the tracks 1, 2, and 3 is used as the predetermined pattern.

11. The iris recognition system of claim 10, wherein the feature value extractor is configured to generate a hash value by selecting an LL3 part of the iris image.

12. The iris recognition system of claim 10, wherein the feature value extractor is configured to generate an image filter necessary for hash value generation by selecting the LL3 part of the iris image extracted from a spatial domain, a frequency domain, or a scale domain instead of the spatial and frequency domains.

13. The iris recognition system of claim 10, further comprising:
a fake iris decider for determining whether an iris is fake, wherein the fake iris decider performs Error Correction Code (ECC) encryption.

* * * * *